(12) United States Patent
Malloy

(10) Patent No.: US 11,179,619 B2
(45) Date of Patent: Nov. 23, 2021

(54) ASSISTANT COACH SYSTEM

(71) Applicant: Morganne Malloy, Ladera Ranch, CA (US)

(72) Inventor: Morganne Malloy, Ladera Ranch, CA (US)

( * ) Notice: Subject to any disclaimer, the term of this patent is extended or adjusted under 35 U.S.C. 154(b) by 14 days.

(21) Appl. No.: 16/776,998

(22) Filed: Jan. 30, 2020

(65) Prior Publication Data

US 2020/0246676 A1 Aug. 6, 2020

Related U.S. Application Data

(60) Provisional application No. 62/799,877, filed on Feb. 1, 2019.

(51) Int. Cl.
| | |
|---|---|
| *A63B 71/06* | (2006.01) |
| *G06F 3/0481* | (2013.01) |
| *G06F 3/0482* | (2013.01) |
| *G06F 3/16* | (2006.01) |
| *H04R 1/10* | (2006.01) |
| *G06F 3/0485* | (2013.01) |

(52) U.S. Cl.
CPC ........ *A63B 71/0622* (2013.01); *G06F 3/0482* (2013.01); *G06F 3/0485* (2013.01); *G06F 3/04817* (2013.01); *G06F 3/165* (2013.01); *H04R 1/1016* (2013.01); *H04R 1/1041* (2013.01); *A63B 2071/063* (2013.01); *A63B 2225/50* (2013.01); *H04R 2420/07* (2013.01)

(58) Field of Classification Search
CPC ............. A63B 71/0622; G06F 3/04817; G06F 3/0485; G06F 3/165; H04R 1/1016; H04R 1/1041

USPC ........................................................ 434/247
See application file for complete search history.

(56) References Cited

U.S. PATENT DOCUMENTS

| | | | | |
|---|---|---|---|---|
| 8,001,472 | B2* | 8/2011 | Gilley | G16H 40/67 |
| | | | | 715/716 |
| 9,392,941 | B2* | 7/2016 | Powch | A61B 5/0015 |
| 9,710,711 | B2* | 7/2017 | Dibenedetto | A63F 13/211 |
| 9,760,692 | B2* | 9/2017 | Erkkila | G16H 20/30 |
| 9,950,236 | B1* | 4/2018 | Jooste | G16H 20/30 |
| 10,660,546 | B2* | 5/2020 | Saigh | G16H 20/30 |
| 10,671,705 | B2* | 6/2020 | Capell | A61B 5/22 |
| 10,751,571 | B2* | 8/2020 | Lee | G01S 19/19 |
| 10,918,911 | B2* | 2/2021 | Martin | A63B 71/0616 |
| 2007/0213126 | A1* | 9/2007 | Deutsch | A63B 71/0686 |
| | | | | 463/36 |
| 2008/0077620 | A1* | 3/2008 | Gilley | A63B 22/02 |
| 2010/0015585 | A1* | 1/2010 | Baker | A61B 5/11 |
| | | | | 434/247 |
| 2012/0088544 | A1* | 4/2012 | Bentley | A63B 69/36 |
| | | | | 455/556.1 |
| 2015/0258383 | A1* | 9/2015 | Quatrochi | A63B 71/0697 |
| | | | | 700/91 |

(Continued)

*Primary Examiner* — William D Titcomb
(74) *Attorney, Agent, or Firm* — Robert Crownover

(57) ABSTRACT

An assistant coach system and methods can include: displaying a listed athlete and a record icon on a user device; detecting a selection of the listed athlete as a selected athlete; detecting a selection of the record icon; recording audio with coach audio equipment, based on the record icon being selected; transmitting the audio from the user device to athlete audio equipment worn by the selected athlete; and storing the audio on a distributed computing system for later replay by the athlete.

18 Claims, 10 Drawing Sheets

(56) References Cited

U.S. PATENT DOCUMENTS

| | | | |
|---|---|---|---|
| 2016/0259538 A1* | 9/2016 | Stephens | H04L 51/36 |
| 2018/0028896 A1* | 2/2018 | Ray | A63B 71/0622 |
| 2020/0047031 A1* | 2/2020 | Orady | A63B 24/0062 |
| 2020/0054922 A1* | 2/2020 | Azaria | A63B 24/0087 |
| 2020/0054931 A1* | 2/2020 | Martin | G06F 3/011 |
| 2020/0230486 A1* | 7/2020 | Shau | A63B 69/18 |

* cited by examiner

ASSISTANT COACH SYSTEM

CROSS-REFERENCE TO RELATED APPLICATION(S)

This claims priority benefit to all common subject matter of U.S. Provisional Patent Application No. 62/799,877 filed Feb. 1, 2019. The content of this application, in its entirety, is incorporated herein by reference.

TECHNICAL FIELD

This disclosure relates to electronic communication systems, more particularly to electronic communication systems with direct and recorded communications between coaches and athletes.

BACKGROUND

Athletic industries are integrally important to some of society's most fundamental purposes including health care, education, and entertainment. Many areas, within these industries, have seen rapid development in recent times; including, the development and application of new materials and electronic devices.

The development and application of electronic devices to the sports industries comes in a multitude of differing forms. Some of these forms are wearables for collecting physiological data, organizational systems for structuring and organizing teams or events, and communication devices for improving instruction or situational awareness.

These devices have unique attributes that have significant impacts on design and functionality in that they must generally be robust, feature rich, and straightforward to use even under demanding circumstances. Electronic devices, developed for the sports industries, have witnessed ever-increasing commercial competitive pressures, along with growing consumer expectations and the diminishing opportunities for meaningful product differentiation in the marketplace.

Significant gaps between the current communication capabilities and the available supporting electronic technologies have been identified. The limitations and issues with current technologies include difficulty of communication between athlete and coach especially with increasing distance or through physical barriers such as under water or through protective equipment.

Many problems arise as a direct result of difficult communication between athlete and coach. One problem is that athletes can miss out on important corrections to their performance and technique, which can prolong athletic development and reduce the effectiveness of training programs. Other problems impacting athletic development can arise when athletes forget corrections earlier communicated.

These problems can stem from a prohibitively large workload of both a coach and an athlete. Coaches may find themselves able to provide general corrections to athletic performance and may yet be unable to provide detailed corrections to nuanced movement, which can be critical to effective athletic development and elite performance.

That is, providing detailed corrections, effectively at increasing distances or through physical barriers, requires coaches to remember, log, and later communicate corrections to each individual athlete. And this typically must be done, if at all, after the teaching moment and the athletic performance has ended. Athletes are required to remember, and mentally associate the correction with the performance after the athletic performance has ended.

There have been many approaches to addressing the communication ineffectiveness between coach and athlete. Illustratively, some football organizations have adopted the use of electronic headsets worn by coaches and players.

This approach offers a partial solution by allowing a coach to broadcast to team members without allowing an opposing team to intercept the communication. The clarity of the communication and ease of transmission is an improvement in general athletic communications; however, the broadcast technique does little to solve the problem of increased workload for both the coach and the athlete.

Since the message is broadcast to every player, it is difficult to provide personal detailed corrections to an individual athlete. The coach and athlete are still required to remember and communicate after the athletic performance is over.

In view of the ever-increasing commercial pressures, along with growing consumer expectations and the diminishing opportunities for meaningful product differentiation in the marketplace, it is critical that answers be found for these problems. Thus, a need remains for effective individual communications between athlete and coach. Solutions have been long sought but prior developments have not taught or suggested any complete solutions and, thus, solutions to these problems have long eluded those skilled in the art.

SUMMARY

An assistant coach system and methods, providing increased communication effectiveness, are disclosed. The assistant coach system and methods can include: displaying a listed athlete and a record icon on a user device; detecting a selection of the listed athlete as a selected athlete; detecting a selection of the record icon; recording audio with coach audio equipment, based on the record icon being selected; transmitting the audio from the user device to athlete audio equipment worn by the selected athlete; and storing the audio on a distributed computing system for later replay by the athlete.

Other contemplated embodiments can include objects, features, aspects, and advantages in addition to or in place of those mentioned above. These objects, features, aspects, and advantages of the embodiments will become more apparent from the following detailed description, along with the accompanying drawings.

BRIEF DESCRIPTION OF THE DRAWINGS

The assistant coach system is illustrated in the figures of the accompanying drawings which are meant to be exemplary and not limiting, in which like reference numerals are intended to refer to like components, and in which:

FIG. 10 is a control flow for the assistant coach system of FIG. 1 in an information display phase of operation, while

DETAILED DESCRIPTION

Figure 1:
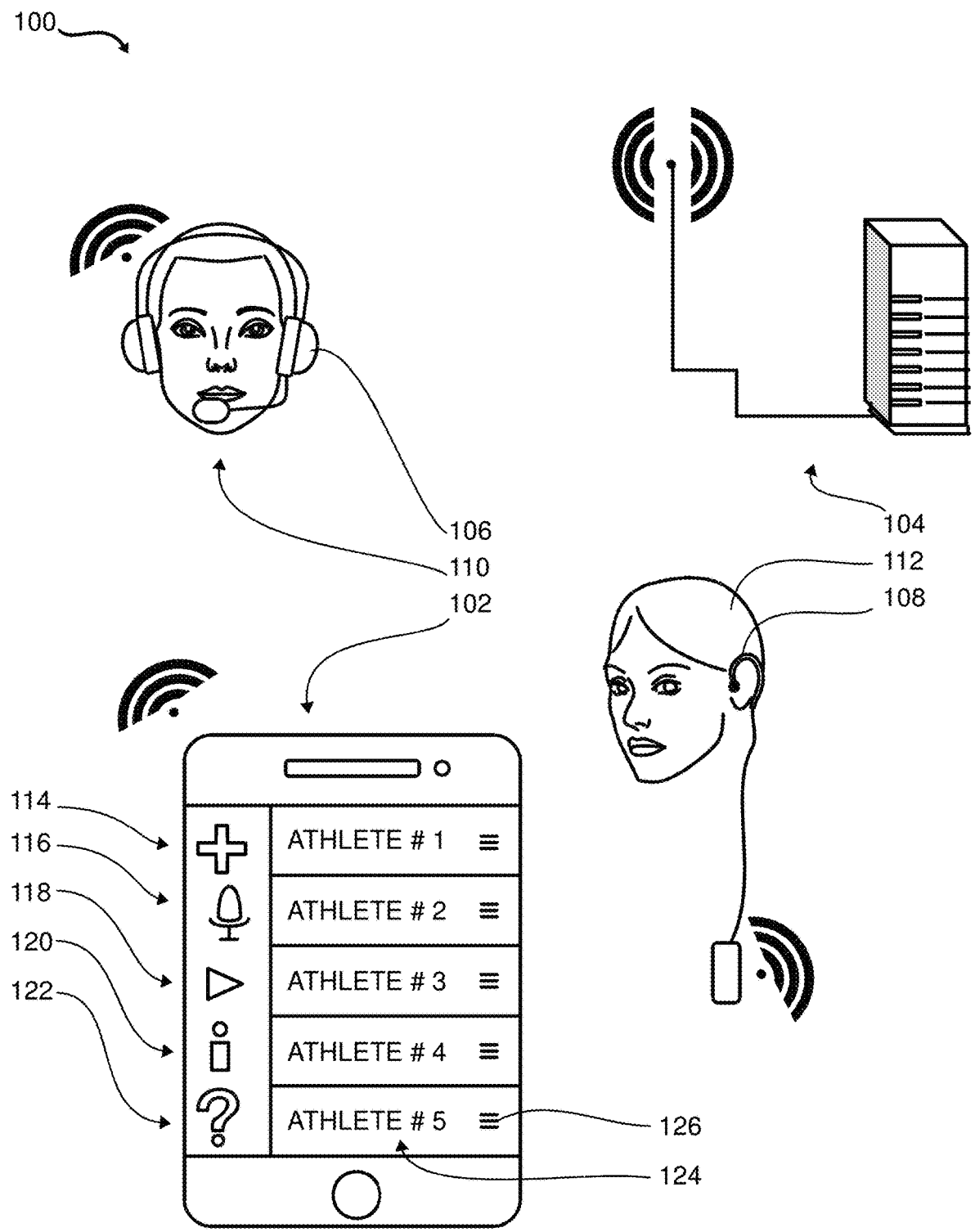
FIG. 1 is a diagrammatic overview of the assistant coach system.

In the following description, reference is made to the accompanying drawings that form a part hereof, and in which are shown by way of illustration, embodiments in which the assistant coach system may be practiced. It is to be understood that other embodiments may be utilized and structural changes may be made without departing from the scope of the assistant coach system.

When features, aspects, or embodiments of the assistant coach system are described in terms of steps of a process, an operation, a control flow, or a flow chart, it is to be understood that the steps can be combined, performed in a different order, deleted, or include additional steps without departing from the assistant coach system as described herein.

The assistant coach system is described in sufficient detail to enable those skilled in the art to make and use the assistant coach system and provide numerous specific details to give a thorough understanding of the assistant coach system; however, it will be apparent that the assistant coach system may be practiced without these specific details.

In order to avoid obscuring the assistant coach system, some well-known system configurations, algorithms, formulas, and descriptions, along with ordinary skills within the programming arts, are not disclosed in detail. Likewise, the drawings showing embodiments of the system are semi-diagrammatic and not to scale and, particularly, some of the dimensions are for the clarity of presentation and are shown greatly exaggerated in the drawing FIGS.

Referring now to FIG. 1, therein is shown a diagrammatic overview of the assistant coach system 100. The assistant coach system 100 can include user devices 102 coupled to a distributed computing system 104. The assistant coach system 100 is further depicted with audio equipment communicatively coupled to the user devices 102 and the distributed computing system 104.

The audio equipment can include coach audio equipment 106 and athlete audio equipment 108. It is contemplated, for example, that the audio equipment can detect audio, record audio data, transmit audio data, reproduce audio, and encode or decode audio data.

Illustratively, the coach audio equipment 106 can be worn by a coach 110 and is depicted as a headset with a microphone. As will be appreciated, the coach audio equipment 106 can provide two-way communication by both transmitting audio data and by receiving audio data. In other contemplated embodiments the coach audio equipment 106 can be a one way device recording and transmitting the coach's 110 instructions, without receiving audio data from external sources.

The athlete audio equipment 108 can be worn by an athlete 112. In one illustrative embodiment, the athlete audio equipment 108 can be implemented as waterproof ear buds providing one-way audio data reception from the coach 110 to the athlete 112.

It has been discovered that wrapping the athlete audio equipment 108 around the ears of the athlete 112 can greatly increase the attachment rigidity of the athlete audio equipment 108 to the athlete 112. Thus, the athlete audio equipment 108 configured to wrap around the ear of the athlete 112 increases the effectiveness of the athlete audio equipment 108 for greater acceleration ranges during dives, flip turns, and open turns.

In one illustrative implementation, the user device 102 can be used by the coach 110 in combination with the coach audio equipment 106 to communicate with the athlete audio equipment 108 worn by the athlete 112. The user device 102 can display operation icons including an add icon 114, a record icon 116, a play icon 118, an information icon 120, a help icon 122. The user device 102 can further display listed athletes 124 and contextual menus 126 for each of the listed athletes 124.

When the assistant coach system 100 detects the selection of the add icon 114, the assistant coach system 100 can be configured to run in coach mode and provide athlete entry fields for entering a new athlete into the set of listed athletes 124. The assistant coach system 100 can facilitate communication between the coach 110 and the athletes 112.

As is described in greater detail below, with regard to FIG. 8 during the communications phase of operation, the coach 110 can select one of the listed athletes 124, then select the record icon 116. The coach 110 can then speak corrections into the coach audio equipment 106 which is directed only to the athlete 112 selected by the coach 110.

In this way the coach 110 can talk clearly into the selected athlete's 112 ear. This selective communication enables the selected athlete 112 to hear detailed, personal corrections even when wearing protective gear at long distances.

It is contemplated that the coach 110 may select more than one of the listed athletes 124 or may create groups of the listed athletes 124 for fast communication to a subset of all the listed athletes 124. It has been discovered that allowing the coach 110 to select an individual athlete 112 from the listed athletes 124 greatly increases the effectiveness of communication by allowing the coach 110 to communicate personal and specific corrective instructions immediately to the selected athlete 112.

It has been further discovered that personal specific communications between the coach 110 and the athlete 112 improves electronic communication technology by lowering the average power and data requirements of athlete audio equipment 108 because the assistant coach system 100 will only reproduce the coach's 110 corrections for the athlete 112 selected rather than a team wide broadcast.

The coach 110 can access information about each athlete 112 as they are listed on the user device 102. The coach 110, for example, may select one of the athletes 112 and select the information icon 120. Further, the coach 110 can modify, add, or delete information by selecting the information icon 120.

Figure 10:
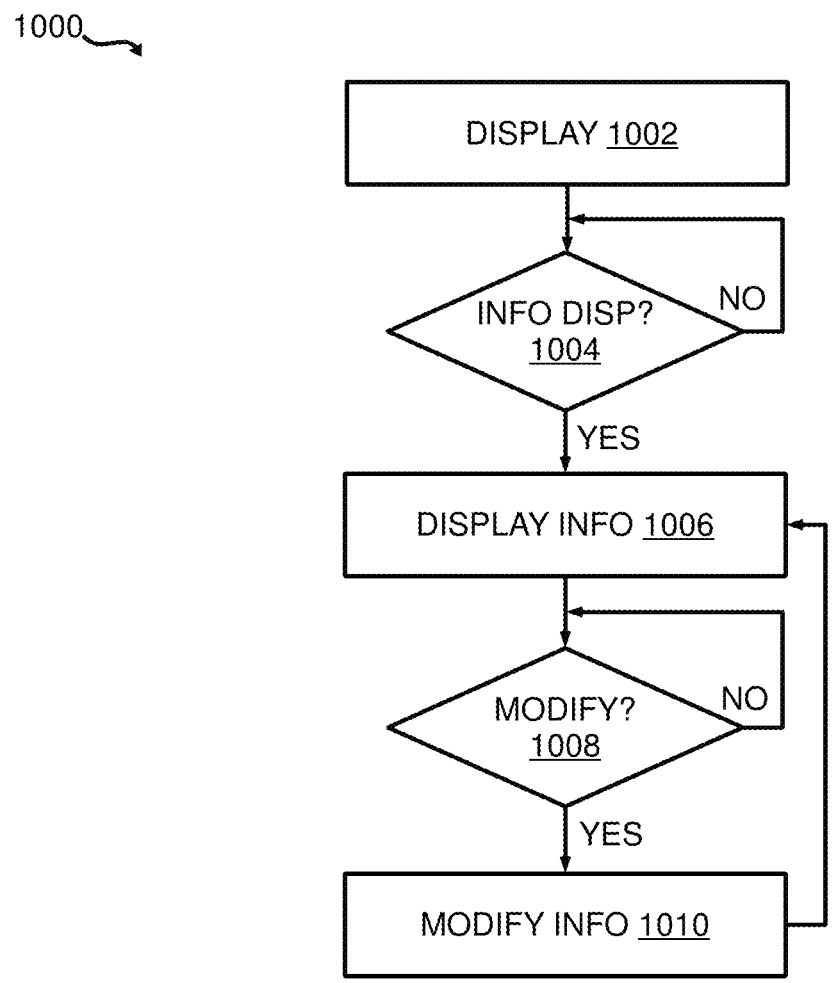
Figure 10B:
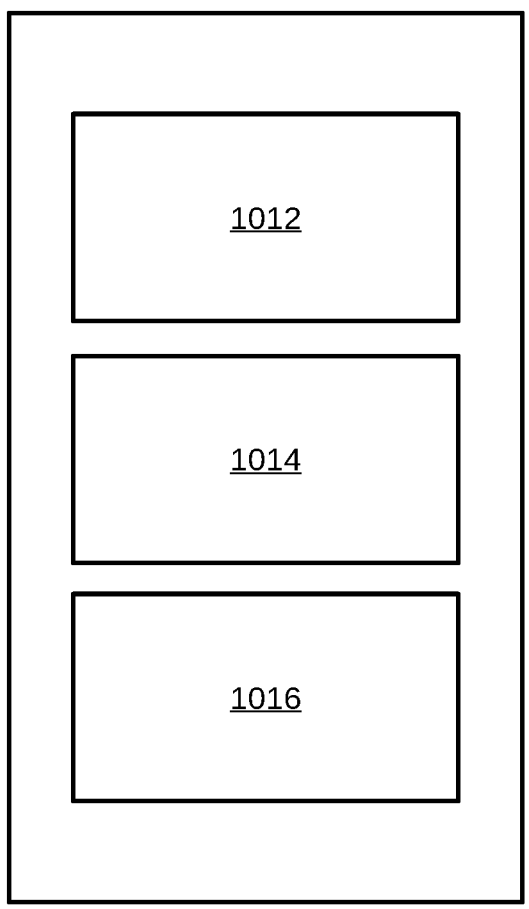
FIG. 10B is a block diagram of the information display phase of FIG. 10.

The athlete's information can include the athlete's 112 athletic statistics 1012 of FIG. 10B, technique corrections 1014 of FIG. 10B, history of technique corrections 1016 of FIG. 10B, schedules, contact information, and development notes, for example. The information icon 120 along with the add icon 114, the record icon 116, the play icon 118, and the help icon 122 can be displayed in a column adjacent to the listed athletes 124 and the contextual menus 126. FIG. 10B depicts the athletic statistics 1012, technique corrections 1014, and history of technique corrections 1016 for the selected athlete as blocks representing and designating information displayed without disclosing subject matter related to the visual depiction of the display on the user device 102, including placement, size, position, and order of the information.

In an alternative embodiment, the icons can be contained within a drop-down bar, which can be collapsed and expanded. The assistant coach system 100 can provide a scroll function and a search function for the listed athletes 124 when the number of the listed athletes 124 is greater than the number of athletes that can be displayed on the user device 102.

It has been discovered that listing only the add icon 114, the record icon 116, the play icon 118, the information icon 120, and the help icon 122 increases intuitive control by listing only essential operations leading to less clutter and a cleaner display. Operations or controls that are not used as frequently can be included in the contextual menus 126 for each of the listed athletes 124.

The athlete audio equipment 108, the coach audio equipment 106, the user device 102, and the distributed computing system 104 can be wirelessly and communicatively coupled. The coach audio equipment 106, for example, can wirelessly communicate with the user device 102 utilizing low-power lightweight wireless protocol in the ISM band, such as Bluetooth.

Additionally, the athlete audio equipment 108 can communicate with the user device 102 using Bluetooth or other wireless protocol. The athlete audio equipment 108 can receive audio data including corrective instruction from the user device 102 and can reproduce the audio, in real time, allowing the athlete 112 to make immediate correction to their performance.

The distributed computing system 104 can include servers, routers, and other telecommunications infrastructure. The distributed computing system 104 can include the internet, a wide area network, a metropolitan area network, a local area network, a telephone network, cellular data network, or a combination of these and other networks.

The distributed computing system 104 can function to process, store, and transmit data for the assistant coach system 100. It is contemplated that the distributed computing system 104 and the user devices 102 can individually comprise a central processing unit, memory, storage, input-output components, and other constituent components configured to execute applications suitable for displaying the listed athletes 124, the contextual menus 126, and the operation icons. The interface of the user device 102 can be optionally generated by a remote processor on the distributed computing system 104.

As described below with regard to FIG. 9 directed to the assistant coach system 100 during a replay phase of operation, the assistant coach system 100 can further include a web browser operative for, by way of example, retrieving web pages or other markup language streams, presenting those pages or streams, executing scripts, controls and other code on those pages or streams, accepting user input with respect to those pages or streams, and issuing HTTP requests with respect to those pages or streams. The web pages or other markup language can be in HAML, CSS, HTML, Ruby on Rails or other conventional forms.

The user device 102 and the distributed computing system 104 can be used individually or in combination to store and process information from the assistant coach system 100 in the form of operation method steps such as detecting steps, recording steps, and displaying steps.

Figure 2:
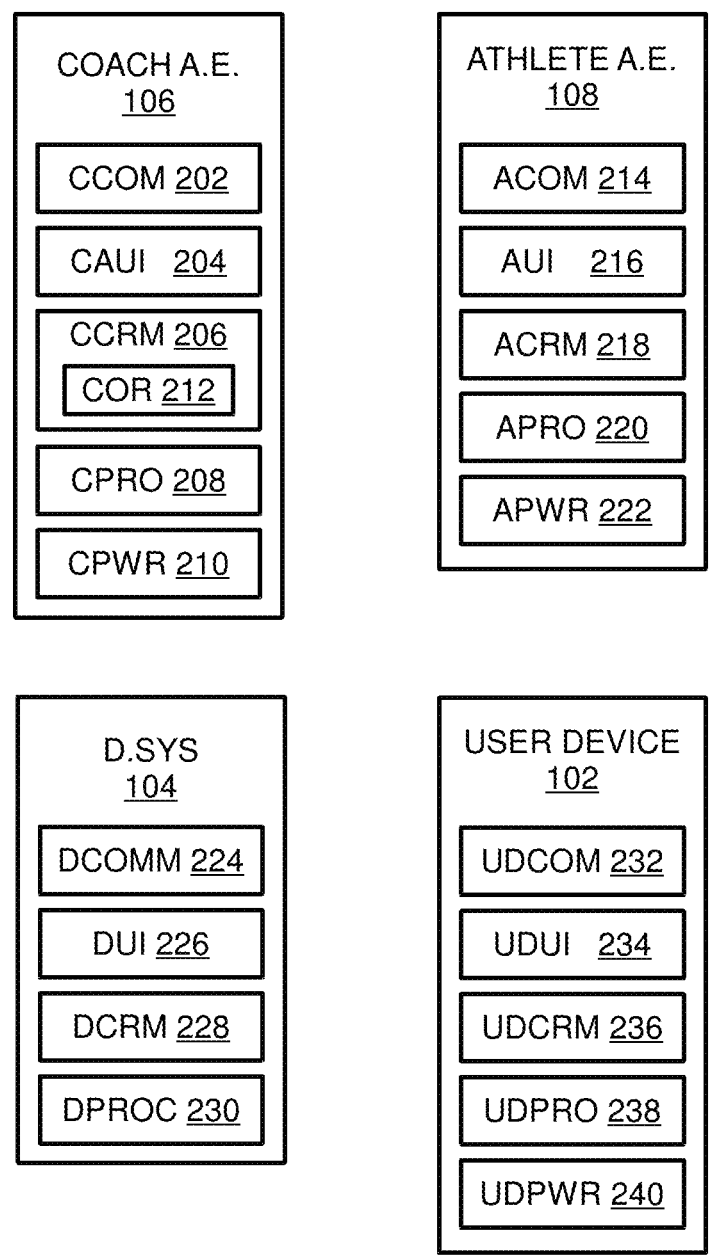
FIG. 2 is a block diagram of the assistant coach system of FIG. 1.

Referring now to FIG. 2, therein is shown a block diagram of the assistant coach system 100 of FIG. 1. The assistant coach system 100 is depicted including the athlete audio equipment 108, the coach audio equipment 106, the user device 102, and the distributed computing system 104.

The coach audio equipment 106 can include a coach communications module 202, a coach audio user interface 204, a coach computer readable medium 206, a coach processor 208, and a coach power module 210.

The coach communications module 202 is contemplated to include antennae, transmitters, receivers, clocks, modulators and other components configured to provide data transmission between the coach audio equipment 106 and the user device 102. Illustratively, it is contemplated that the coach communications module 202 can provide Bluetooth or WiFi communications with the user device 102 or, in alternative embodiments, the distributed computing system 104.

The coach audio user interface 204 can be a speaker and microphone. The coach audio user interface 204 can provide feedback of the coach's 110 voice, of FIG. 1, through the headphones as well as detect the coach's 110 corrections 212 for storage within the coach computer readable medium 206.

The coach computer readable medium 206 can be non-transitory computer readable medium for storing the corrections 212 from the coach 110 as well as instructions configured to operate the coach audio equipment 106. The correction 212 can be temporarily stored in the coach computer readable medium 206 for later transmission to the user device 102 or the distributed computing system 104 through the coach communications module 202.

The instructions contained on the coach computer readable medium 206 can be executed by the coach processor 208. The audio captured and detected by the coach audio user interface 204 can be compressed, encoded, decoded, retrieved, or stored by the coach processor 208. The coach power module 210 can provide power in the form of electric storage. For example, the coach power module 210 is contemplated to be a battery for mobile operation of the coach audio equipment 106.

The athlete audio equipment 108 can include an athlete communications module 214, an athlete audio user interface 216, an athlete computer readable medium 218, an athlete processor 220, and an athlete power module 222.

The athlete communications module 214 is contemplated to include antennae, transmitters, receivers, clocks, modulators and other components configured to provide data transmission between the athlete audio equipment 108 and the user device 102, the distributed computing system 104, or a combination thereof. Illustratively, it is contemplated that the athlete communications module 214 can provide Bluetooth or WiFi communications with the user device 102 or, in alternative embodiments, the distributed computing system 104.

The athlete audio user interface 216 can be a speaker. The athlete audio user interface 216 can provide reproduction of the corrections 212 through the headphones.

The athlete computer readable medium 218 can be non-transitory computer readable medium for storing the corrections 212 from the coach 110 as well as instructions configured to operate the athlete audio equipment 108.

The correction 212 can be temporarily stored in the athlete computer readable medium 218 for replay to the athlete 112 through the athlete audio user interface 216. The corrections 212 can also be stored or buffered by the athlete computer readable medium 218.

The instructions contained on the athlete computer readable medium 218 can be executed by the athlete processor 220. The audio received by the athlete communications module 214 can be compressed, encoded, decoded, retrieved, or stored by the athlete processor 220. The athlete power module 222 can provide power in the form of electric storage. For example, the athlete power module 222 is contemplated to be a battery for mobile operation of the athlete audio equipment 108.

The distributed computing system 104 can include distributed communications modules 224, distributed user interface 226, distributed computer readable medium 228, and distributed processors 230.

The distributed communications modules 224 are contemplated to include antennae, transmitters, receivers, clocks, modulators and other components configured to provide data transmission between the distributed computing system 104 and the coach audio equipment 106 and the athlete audio equipment 108. Illustratively, it is contemplated that the distributed communications module 224 is contemplated to provide Bluetooth, WiFi, internet, or cellular communication connectivity with the user device 102 or, in alternative embodiments, the distributed communications module 224 can provide communication connectivity with the athlete audio equipment 108 and the coach audio equipment 106.

The distributed user interface 226 can be a graphical user interface for display on a laptop, tablet, smart phone, or other user device providing an audio-visual interface for both the coach 110 and the athlete 112. As will be described below with regard to FIG. 9, the coach 110 and the athlete 112 can access the distributed user interface 226 for replaying the corrections 212 at a later time. Illustratively, for example, the distributed user interface 226 can for example be a web page displayed on the user device 102, as depicted in FIGS. 3-7.

The distributed computer readable medium 228 can be non-transitory computer readable medium for storing the corrections 212 from the coach 110 as well as instructions configured to operate the distributed computing system 104. The correction 212 can be stored in the distributed computer readable medium 228 for replay to the athlete 112 at a later time.

The instructions contained on the distributed computer readable medium 228 can be executed by the distributed processors 230. The audio received by the distributed communications module 224 can be compressed, encoded, decoded, retrieved, or stored by the distributed processor 230.

The user device 102 can include a user device communications module 232, a user device interface 234, a user device computer readable medium 236, a user device processor 238, and a user device power module 240.

The user device communications module 232 is contemplated to include antennae, transmitters, receivers, clocks, modulators and other components configured to provide data transmission between the user device 102 and the coach audio equipment 106, athlete audio equipment 108, and the distributed computing system 104. Illustratively, it is contemplated that the user device communications module 232 can provide Bluetooth, WiFi, or cellular communications with the coach audio equipment 106, the athlete audio equipment 108, and the distributed computing system 104.

The user device interface 234 can include a display, input keys, touch sensitive screens or areas, speakers, and microphones. The user device interface 234 can, for example, display the listed athletes 124 of FIG. 1, along with the operation icons of FIG. 1.

The user device interface 234 is further, for example, depicted in FIGS. 3-7. It is contemplated that the distributed user interface 226 can be displayed on the user device interface 234. It is further contemplated that the user device interface 234 can display other aspects of the assistant coach system 100 not contained within the distributed user interface 226, which can for example include coach 110 or athlete 112 specific data stored on the user device 102 of the coach 110 or the athlete 112 individually.

The user device computer readable medium 236 can be non-transitory computer readable medium for storing the corrections 212 from the coach 110 as well as instructions configured to operate the user device 102. The correction 212 can be stored in the user device computer readable medium 236 for later transmission to the coach audio equipment 106, the athlete audio equipment 108, or the distributed computing system 104 and through the user device communications module 232.

The instructions contained on the user device computer readable medium 236 can be executed by the user device processor 238. The audio captured and detected by the coach audio equipment 106 can be compressed, encoded, decoded, retrieved, or stored by the user device processor 238.

In some contemplated embodiments the user device processor 238 can be configured to compress, encode, decode, retrieve, or store audio data on the coach audio equipment 106, the athlete audio equipment 108, the distributed computing system 104, the user device 102, or a combination thereof.

The user device power module 240 can provide power in the form of electric storage. For example, the user device power module 240 is contemplated to be a battery for mobile operation of the user device 102.

Figure 3:
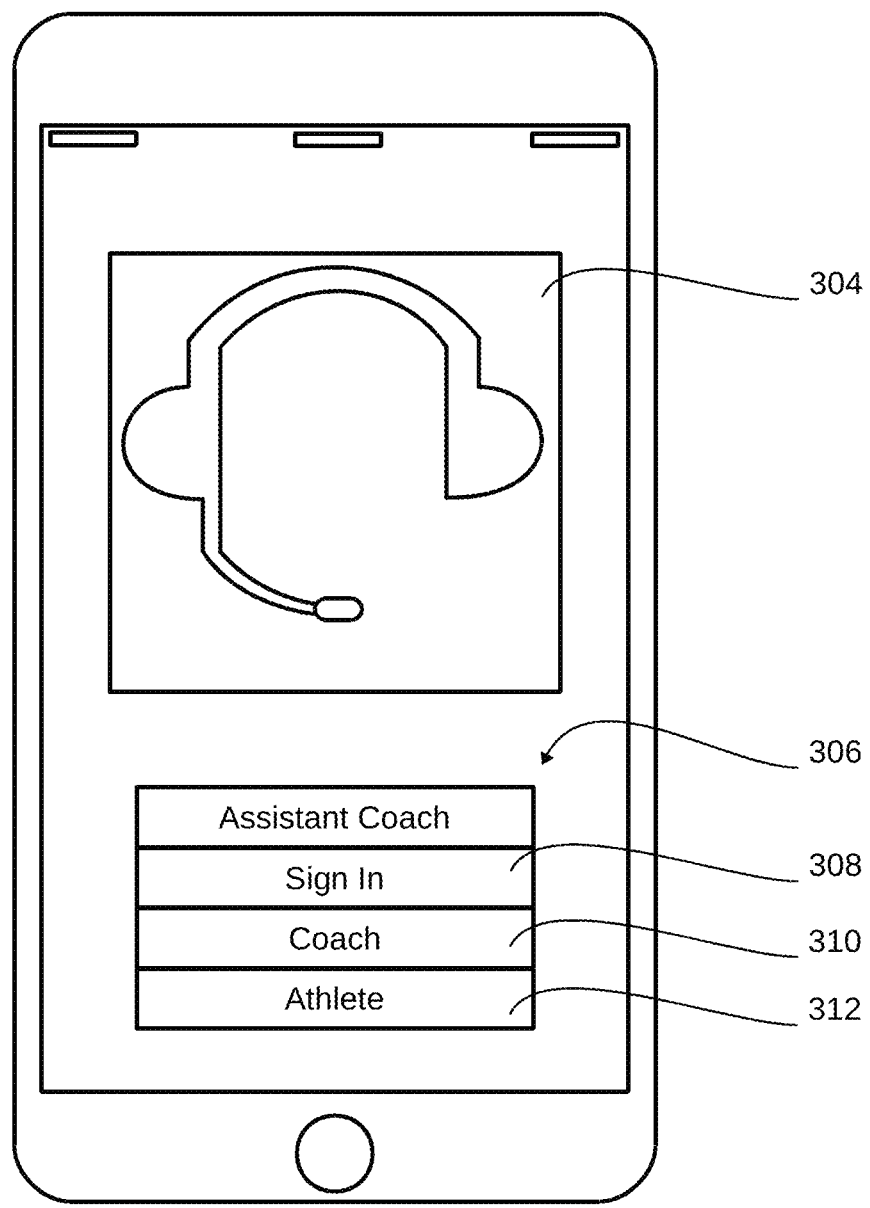
FIG. 3 is a graphical display of a home screen for the assistant coach system of FIG. 1.

Referring now to FIG. 3, therein is shown a graphical display of a home screen 302 for the assistant coach system 100 of FIG. 1. The home screen 302 can include a logo 304 of the assistant coach system 100 and a drop-down menu 306.

The drop-down menu 306 can allow the coach 110 of FIG. 1 or the athlete 112 of FIG. 1 to select a sign in option 308, a coach option 310, and an athlete option 312. If the coach option 310 is selected, the assistant coach system 100 can load the coach screen 402 of FIG. 4. If the athlete option 312 is selected, the assistant coach system 100 can load the athlete screen 602 of FIG. 6.

Figure 4:
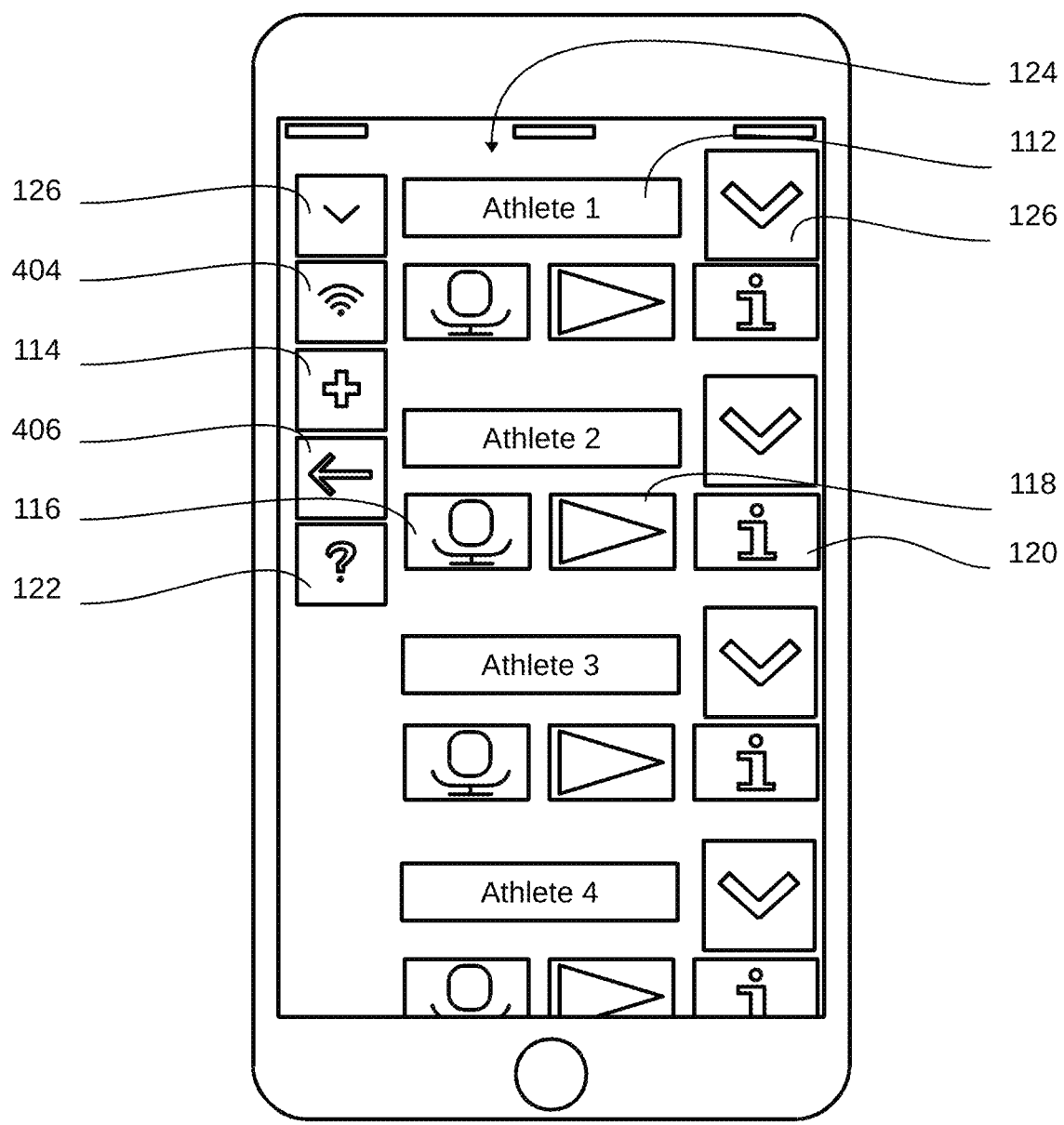
FIG. 4 is a graphical display of a coach screen for the assistant coach system of FIG. 1.

Referring now to FIG. 4, therein is shown a graphical display of a coach screen 402 for the assistant coach system 100 of FIG. 1. The coach screen 402 can include the listed athletes 124 displayed next and adjacent to a column including the contextual menus 126, a connection options menu 404, the add icon 114, a back icon 406, and the help icon 122.

Illustratively, for example, it is contemplated that the coach 110 could select the contextual menus 126 without selecting one of the athletes 112 in order to configure global settings or settings that can apply to all athletes 112 collectively. The connection options menu 404 can provide the coach 110 with the ability to configure the communication settings of the user device 102 of FIG. 1 without exiting from the assistant coach system 100.

Further, the connection options menu 404 can provide options for connecting the coach audio equipment 106 of FIG. 1 to the user device 102 or to the distributed computing system 104 of FIG. 1. For example, the connection options menu 404 can include Bluetooth connectivity options.

The add icon 114 can be selected by the coach 110 and can provide athlete entry fields for entering a new athlete into to the set of listed athletes 124. The back icon 406 can be selected by the coach 110 in order to load a previous screen or the home screen 302 of FIG. 3.

Figure 7:
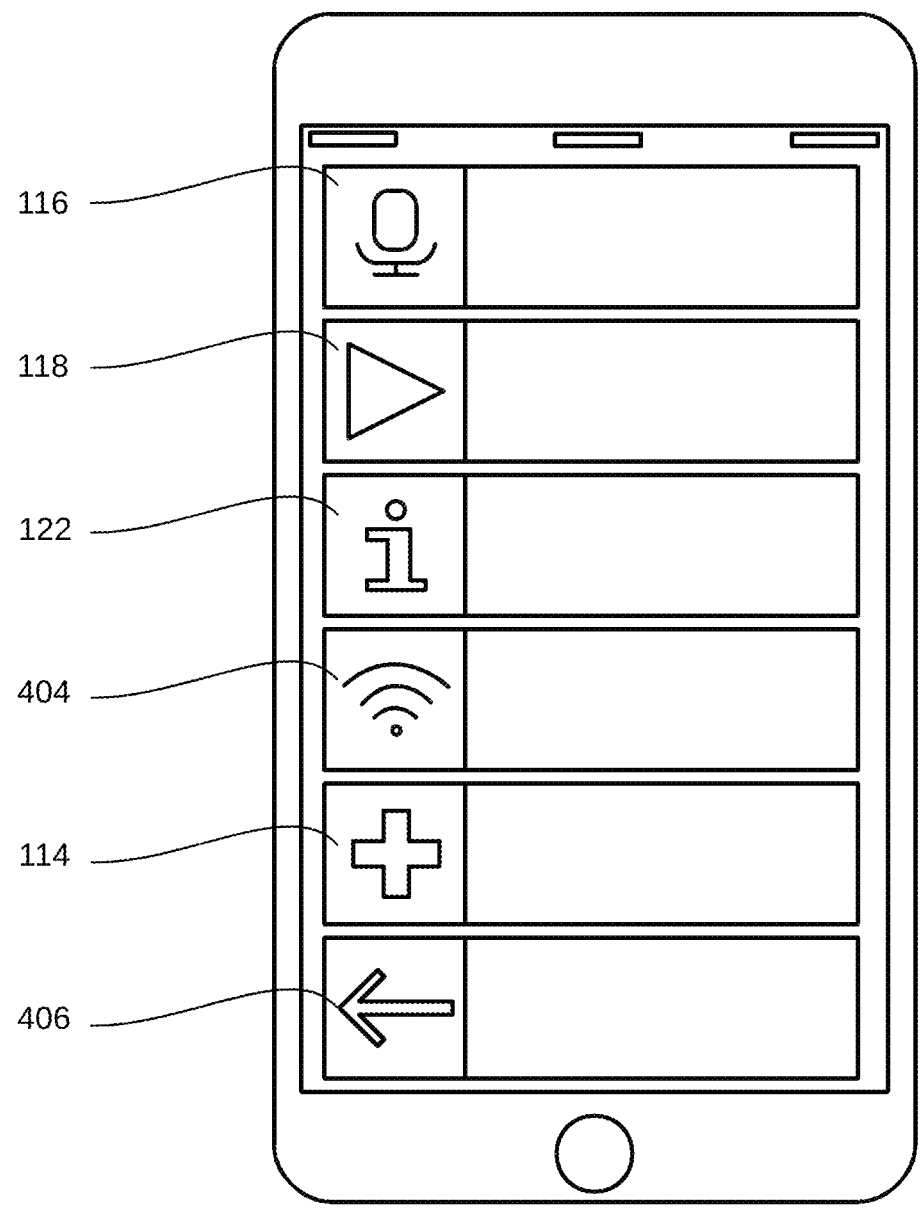
FIG. 7 is a graphical display of a help screen for the assistant coach system of FIG. 1.

The help icon 122 can be selected by the coach 110 within the coach screen 402 in order to load the help screen 702 of FIG. 7. Each of the listed athletes 124 can be displayed with individual control buttons for streamlining workflow within the assistant coach system 100.

For example, each of the listed athletes 124 can be displayed together with the record icon 116, the play icon 118, the contextual menus 126, and the information icon 120. It has been discovered that displaying the listed athletes 124 together with individual icons enables the coach 110 to quickly control the communications between the coach 110 and each of the listed athletes 124.

It is contemplated that the coach screen 402 could be loaded and displayed as shown when the coach option 310 of FIG. 3 is selected. Alternatively, it is contemplated that only the contextual menus 126 can be displayed alongside a list of the athletes 112, and each of the listed athletes 124 including an additional contextual menu 126.

That is, it is contemplated that the coach screen 402 could display the contextual menu 126 for the column next to the listed athletes 124 without displaying the connection options menu 404, the add icon 114, the back icon 406, and the help icon 122. When the contextual menu 126 is selected by the coach 110, then the assistant coach system 100 can drop down and display the connection options menu 404, the add icon 114, the back icon 406, and the help icon 122 in a column next to the listed athletes 124.

It is further contemplated that each of the athletes 112 can be displayed together with the contextual menu 126 selection without displaying the record icon 116, the play icon 118, and the information icon 120 for each of the athletes 112. When the contextual menu 126 selected for any one of the listed athletes 124, the record icon 116, the play icon 118, and the information icon 120 can be displayed for the athlete 112.

In this way the coach screen 402 can include many powerful communication options with a simplified interface. It is contemplated that the coach screen 402 can scroll through the listed athletes 124 when there are more athletes 112 than can fit in the screen of the user device 102.

Figure 5:
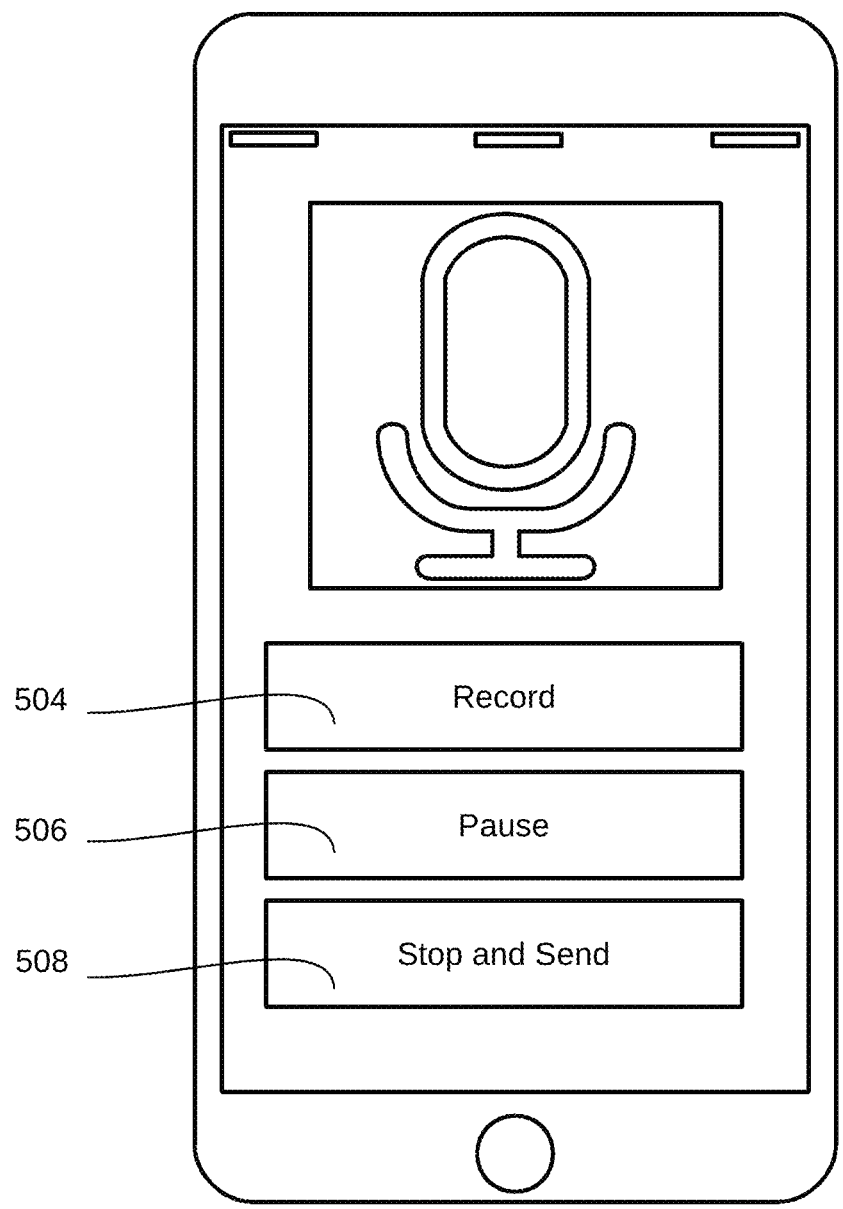
FIG. 5 is a graphical display of a record screen for the assistant coach system of FIG. 1.

Referring now to FIG. 5, therein is shown a graphical display of a record screen 502 for the assistant coach system 100 of FIG. 1. The record screen 502 can include a record button 504, a pause button 506, and a stop and send button 508.

It is contemplated that in one embodiment, when the record icon 116 of FIG. 1 and of FIG. 4, for example, is selected, the coach 110 of FIG. 1 can immediately begin recording for one of the selected athletes 112 of FIG. 1. It is further contemplated that the selection of the record icon 116 can immediately begin recording for all of the athletes 112 when no specific athlete 112 is selected.

Yet further, it is contemplated that when the record icon 116 is selected by the coach 110, the assistant coach system 100 can display the record screen 502 on the user device 102 of FIG. 1. The record screen 502 can provide the coach 110 with finer control of recording the corrections 212 of FIG. 2, and finer control of sending the corrections 212.

That is, the coach 110 can choose to record by pressing the record button 504, the coach 110 can choose to pause the recording by selecting the pause button 506, and the coach 110 can choose to stop and send the corrections 212 by selecting the stop and send button 508. When the stop and send button 508 is selected, the assistant coach system 100 can return to the coach screen 402 of FIG. 4.

Figure 6:
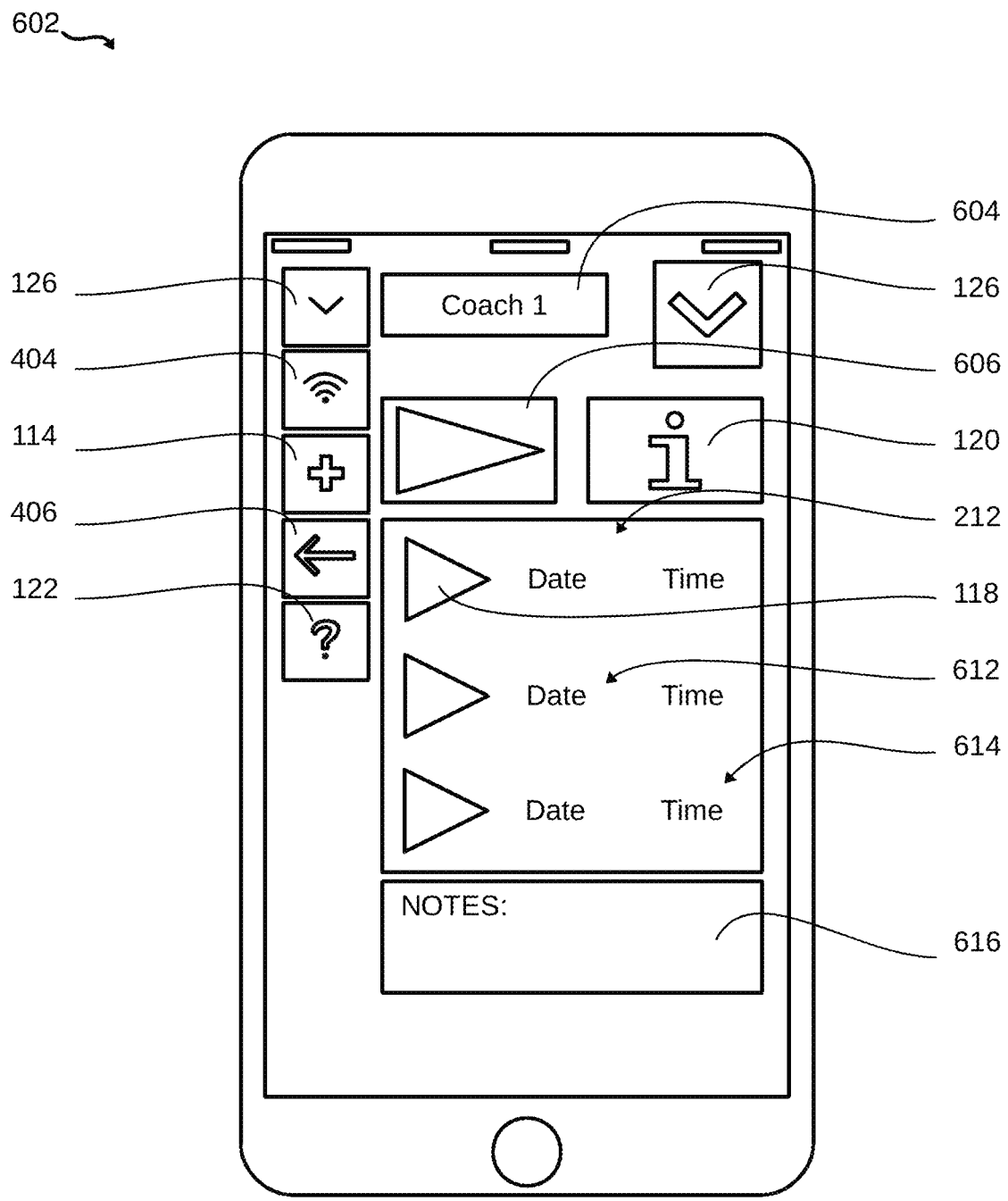
FIG. 6 is a graphical display of an athlete screen for the assistant coach system of FIG. 1.

Referring now to FIG. 6, therein is shown a graphical display of an athlete screen 602 for the assistant coach system 100 of FIG. 1. The athlete screen 602 can include a contextual menu 126 for menu options to be displayed on the left side of the user device 102 of FIG. 1.

Illustratively, the athlete screen 602 is depicted including the connection options menu 404, the add icon 114, the back icon 406, and the help icon 122. It is contemplated that the connection options menu 404, the add icon 114, the back icon 406, and the help icon 122 could all be hidden until the athlete 112 of FIG. 1 selects the contextual menu 126 for the left side, after which the assistant coach system 100 can display the connection options menu 404, the add icon 114, the back icon 406, and the help icon 122.

The connection options menu 404 can provide options for connecting the athlete audio equipment 108 of FIG. 1 to the user device 102 or to the distributed computing system 104 of FIG. 1. For example, the connection options menu 404 can include Bluetooth connectivity options.

The add icon 114 can operate within the context of the athlete screen 602 to add or associate different coaches 110 of FIG. 1 to the athlete 112 using the athlete screen 602. The athlete 112 can have more than one coach 110, for example when the athlete 112 is involved in more than one sport.

The back icon 406 can prompt the assistant coach system 100 to reload the previous screen or the home screen 302 of FIG. 3. The help icon 122 can prompt the assistant coach system 100 to load the help screen 702 of FIG. 7.

The coach 110, associated with the athlete 112, can have coach information 604 displayed next to another contextual menu 126 associated with the displayed coach 110 or coaches 110. The contextual menu 126 associated with the displayed coach 110 can be selected to display a corrections icon 606, the information icon 120.

When the corrections icon 606 is selected, all of the corrections 212 associated with the coach 110 and the athlete 112 will be displayed. For example, the corrections 212 are shown displayed as a list.

The corrections 212 can be selected by the athlete 112. Once one of the corrections 212 is selected by the athlete 112, the athlete 112 can select the play icon 118 or the information icon 120 for the specific correction 212.

The play icon 118 can initiate the replay of the correction 212 on the user device of FIG. 1. The information icon 120 can display any information associated with the correction 212 including a date 612 that the correction 212 was recorded and a time 614 that the correction 212 was recorded.

It is further contemplated that any notes associated with the selected correction 212 can also be displayed in a notes section 616. Any notes for the corrections 212 can be added, modified, or deleted within the notes section 616. The information icon 120 can be selected by the athlete 112 to initiate the display of the notes section 616 allowing the athlete 112 to write notes about themselves or the corrections 212 they receive.

Referring now to FIG. 7, therein is shown a graphical display of a help screen 702 for the assistant coach system 100 of FIG. 1. The help screen 702 can provide a manual to the assistant coach system 100 explaining how to use it.

For example, the help screen 702 can display the record icon 116, the play icon 118, the help icon 122, the connection options menu 404, the add icon 114, the back icon 406, along with any other buttons, icons, menus, or selectable elements of the assistant coach system 100. The help screen 702 can display documentation of how to use the particular portions of the assistant coach system 100 when selected through the help screen 702. It is further contemplated that the help screen 702 can be scrollable and searchable for increased user effectiveness.

Figure 8:
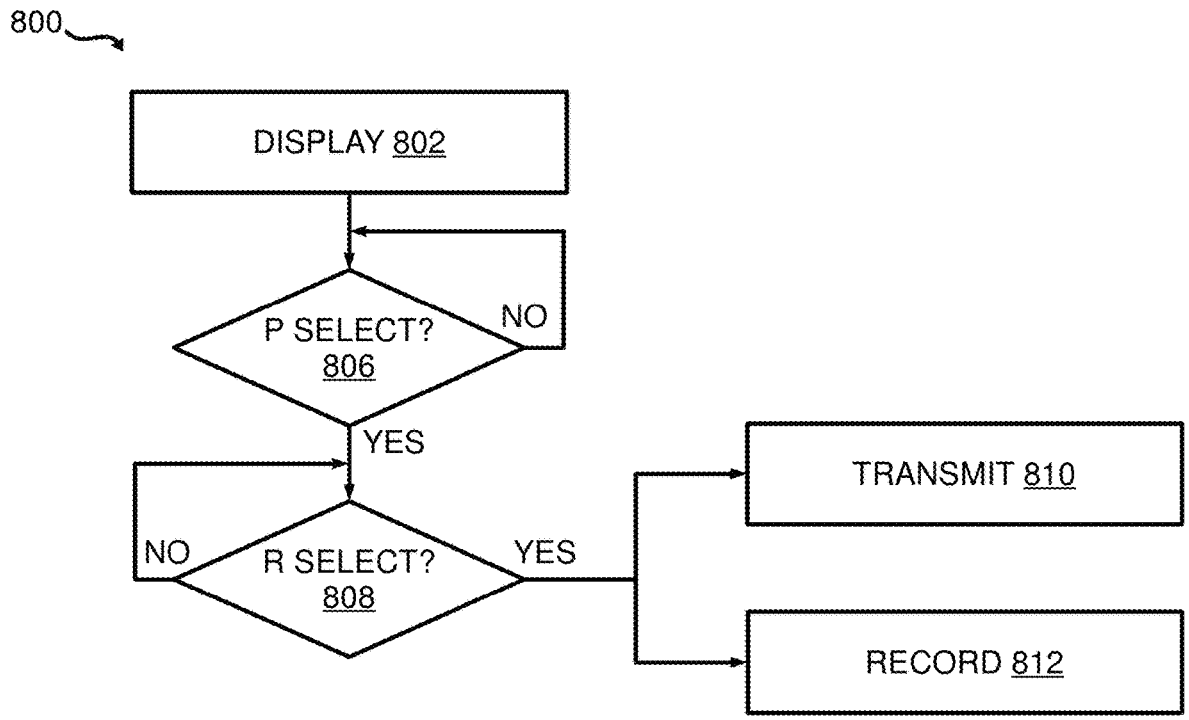
FIG. 8 is a control flow for the assistant coach system of FIG. 1 in a communications phase of operation.

Referring now to FIG. 8, therein is shown a control flow 800 for the assistant coach system 100 of FIG. 1 in a communications phase of operation. During the communications phase of operation, the assistant coach system 100 can execute a display step 802.

The display step 802 can display the listed athletes 124 along with the add icon 114, the record icon 116, the play icon 118, the information icon 120, and the help icon 122, all of which are illustrated in FIG. 1. These elements can be displayed on the user device 102 of FIG. 1.

The assistant coach system 100 can further execute a player selection determination step 806 and a record selection determination step 808. The assistant coach system 100 can execute the record selection determination step 808 to determine whether the coach 110 of FIG. 1 has selected one of the listed athletes 124. If no selection is detected and the player selection determination step 806 returns a negative result, the assistant coach system 100 can re-execute the player selection determination step 806 after a delay.

The assistant coach system 100 can execute the record selection determination step 808 prior to the player selection determination step 806 in alternative embodiments. As shown, however, the record selection determination step 808 can be executed once the player selection determination step 806 returns an affirmative result.

The assistant coach system 100 can execute the record selection determination step 808 to determine whether the coach 110 has selected the record icon 116 displayed on the user device 102. If the coach 110 selects the record icon 116, the record selection determination step 808 will return an affirmative result and the assistant coach system 100 can execute a transmit step 810 and a record step 812.

If the record selection determination step 808 returns a negative result, the assistant coach system 100 can re-execute the record selection determination step 808 after a delay. Once the record selection determination step 808 returns an affirmative result, the assistant coach system 100 can record the corrections 212 of FIG. 2 from the coach audio equipment 106 of FIG. 1 onto the coach computer readable medium 206 of FIG. 2, the athlete computer readable medium 218 of FIG. 2, the distributed computer readable medium 228 of FIG. 2, the user device computer readable medium 236 of FIG. 2, or a combination thereof for later retrieval and replay.

Further, once the record selection determination step 808 returns an affirmative result, the assistant coach system 100 can transmit the corrections 212 to the athlete audio equipment 108 of FIG. 1 for the athlete 112 of FIG. 1 selected by the coach 110. The athlete audio equipment 108 can then reproduce the corrections 212 for the athlete 112 in real time and directly into the athlete's ear.

It is contemplated that the assistant coach system 100 could execute the record step 812 and initially record the correction 212 of FIG. 2 prior to transmitting the corrections during the transmit step 810. The transmit step 810 and the record step 812 could therefore be executed serially rather than in parallel.

It has therefore been discovered that the display and selection detected of the listed athletes 124 and the record icon 116 increases the intuitive ease of use while simultaneously overcoming physical constraints on communication. As will be appreciated, the assistant coach system 100 can enable clear, direct, personal, corrections over large distances and across physical barriers.

It is alternatively contemplated that the record selection determination step 808 could be removed and the transmit step 810 and the record step 812 could be executed immediately after an affirmative result of the player selection determination step 806.

Figure 9:
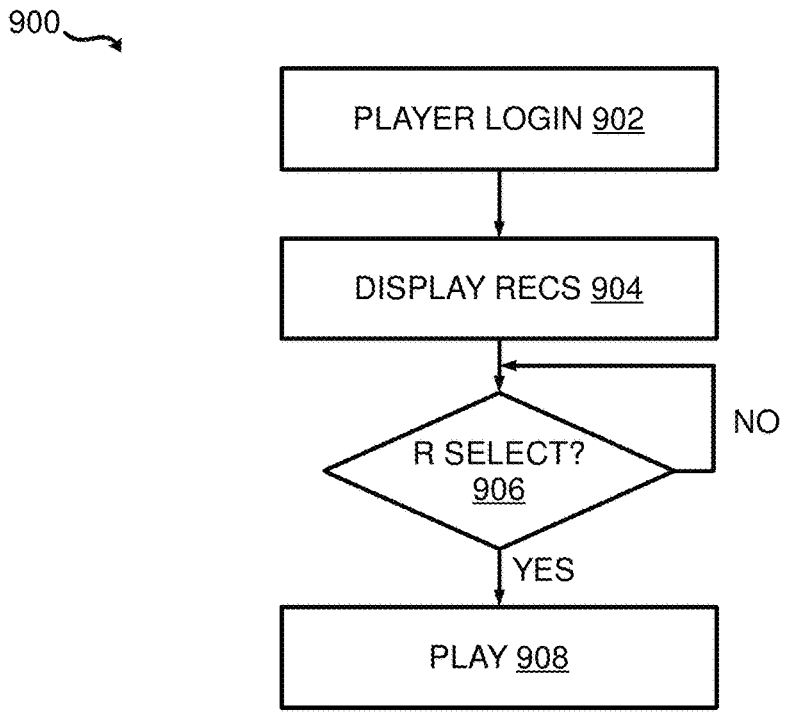
FIG. 9 is a control flow for the assistant coach system of FIG. 1 in a replay phase of operation.

Referring now to FIG. 9, therein is shown a control flow 900 for the assistant coach system 100 of FIG. 1 in a replay phase of operation. The replay phase of operation can be initiated by the athlete 112 of FIG. 1 at a time and location different from that in which the corrections 212 of FIG. 2 are recorded and stored.

Illustratively, for example, the athlete 112 can initiate the replay phase of operation in the athlete's home and after the athletic activity has ended. It has been discovered that allowing the athlete 112 to replay the corrections 212 greatly reduces the workload of the athlete 112 and the coach 110 of FIG. 1. Further it has been discovered that allowing replay of the corrections 212 can increase retention and development of the athlete 112 because the corrections 212 are not merely forgotten.

The assistant coach system 100 can begin the replay phase by executing a player login step 902. It is contemplated that the player login step 902 could provide a login display on the user device 102 of the athlete 112 that is connected to the distributed computing system 104.

Once the athlete 112 has logged into the distributed computing system 104, the assistant coach system 100 can execute a display recordings step 904. The display recordings step 904 can display a list of the recorded corrections 212 for selection by the athlete 112 for example by displaying the distributed user interface 226 of FIG. 2 as a webpage on the user device 102 of FIG. 1.

The assistant coach system 100 can further execute a recording selection determination step 906. The recording selection determination step 906 can be executed in parallel with the display recordings step 904 or can be executed once the display recordings step 904 has completed.

If and when the athlete 112 selects one of the recorded corrections 212, the recording selection determination step 906 will return an affirmative result and the assistant coach system 100 will execute a play step 908 for replaying the correction 212 to the athlete 112. If no selection is detected, the recording selection determination step 906 can return a negative result and the assistant coach system 100 can re-execute the recording selection determination step 906 after a delay.

Referring now to FIG. 10, therein is shown a control flow 1000 for the assistant coach system 100 of FIG. 1 in an information display phase of operation. The assistant coach system 100 can execute a display step 1002.

During the display step 1002 the assistant coach system 100 can display the listed athletes 124 of FIG. 1 along with the information icon 120 of FIG. 1. The assistant coach system 100 can also execute an information selection determination step 1004.

If the coach 110 of FIG. 1 selects the information icon 120 for displaying the information of one or many athletes 112 of FIG. 1, the information selection determination step 1004 can return an affirmative result and the assistant coach system 100 will display player information during a display information step 1006. If the information icon 120 is not selected, the information selection determination step 1004 will return a negative result and the assistant coach system 100 can re-execute the information selection determination step 1004 after a delay.

The assistant coach system 100 can further execute a modify information selection determination step 1008. During the modify information selection determination step 1008, the assistant coach system 100 can determine whether the coach 110 has elected to edit information by selecting an edit button. If no changes are selected, the modify information selection determination step 1008 can return a negative result and the assistant coach system 100 can re-execute the modify information selection determination step 1008 after a delay.

If modifications to the athlete's information is initiated by the coach 110, the assistant coach system 100 can execute a modify information step 1010. During the modify information step 1010 the assistant coach system 100 can provide fields and functions for editing the information of the athlete 112. Once the modify information step 1010 has been completed, the assistant coach system 100 can again execute the display information step 1006 for displaying the current information of the athlete 112 including any modifications made by the coach 110 during the modify information step 1010.

As will be appreciated by those of ordinary skill in the art, the assistant coach system and methods provide real, non-abstract improvements to the user device 102, the athlete audio equipment 108, the coach audio equipment 106, as well as the distributed computing system 104. Illustratively, displaying a listed athlete and a record icon on a user device and detecting a selection of the listed athlete as a selected athlete improves data transmission technology because individual communications directed only to the selected athlete require only low power, light-weight wireless communication and avoiding the need for high power broadcast transmissions and infrastructure. Thus, power requirements are greatly reduced along with the simultaneous reduction in high power broadcast infrastructure which is a common barrier to implementing other solutions.

Further, it has been discovered that detecting a selection of the record icon; recording audio with coach audio equipment, based on the record icon being selected; transmitting the audio from the user device to athlete audio equipment worn by the selected athlete; and storing the audio on a distributed computing system for later replay by the athlete reduces communication infrastructure utilization since important individual corrections are transmitted rather than large volumes of generalized highly repetitive broadcast communications.

The assistant coach system and methods solves the problem of bad communication between coach and athlete by creating a way that the coach can directly talk to the athletes in their ears. Also, the coach can quickly pull up or change information about each athlete. Lastly, the athlete can replay the corrections on their cell phones, tablets, or laptops at any later date. This will help them remember what to work on. The assistant coach system and methods will improve communication resulting in athletes improving at a faster rate.

Thus, it has been discovered that the assistant coach system furnishes important and heretofore unknown and unavailable solutions, capabilities, and functional aspects. The resulting configurations are straightforward, cost-effective, uncomplicated, highly versatile, accurate, sensitive, and effective, and can be implemented by adapting known components for ready, efficient, and economical manufacturing, application, and utilization.

While the assistant coach system has been described in conjunction with a specific best mode, it is to be understood that many alternatives, modifications, and variations will be apparent to those skilled in the art in light of the preceding description. Accordingly, it is intended to embrace all such alternatives, modifications, and variations, which fall within the scope of the included claims. All matters set forth herein or shown in the accompanying drawings are to be interpreted in an illustrative and non-limiting sense.

What is claimed is:

1. An assistant coach method comprising:
displaying a listed athlete, an information icon, and a record icon on a user device;
detecting an athlete selection of the listed athlete as a selected athlete;
detecting a record icon selection of the record icon;
recording audio with coach audio equipment, based on the record icon being selected;
transmitting the audio from the user device to athlete audio equipment worn by the selected athlete;
storing the audio on a distributed computing system for later replay by the selected athlete;
detecting an information icon selection of the information icon; and
displaying athletic statistics, technique corrections, and a history of technique corrections for the selected athlete based on the information icon selection.

2. The method of claim 1 wherein transmitting the audio from the user device to the athlete audio equipment worn by the selected athlete includes transmitting the audio to the athlete audio equipment configured as waterproof earbuds to wrap around an ear of the selected athlete.

3. The method of claim 1 further comprising communicatively coupling the coach audio equipment and the athlete audio equipment to the user device with a low-power lightweight wireless protocol.

4. The method of claim 1 wherein displaying the listed athlete includes displaying the listed athlete within a list having a scroll function and search function.

5. The method of claim 1 further comprising replaying the audio from the distributed computing system.

6. The method of claim 1 further comprising displaying operation icons including an add icon, the record icon, a play icon, the information icon, and a help icon, and wherein the operation icons are displayed in a column adjacent to the listed athlete.

7. A non-transitory computer readable medium, useful in association with a processor, including instructions configured to:
display a listed athlete, an information icon, and a record icon on a user device;
detect an athlete selection of the listed athlete as a selected athlete;
detect a record icon selection of the record icon;
record audio with coach audio equipment, based on the record icon being selected;
transmit the audio from the user device to athlete audio equipment worn by the selected athlete;
store the audio on a distributed computing system for later replay by the selected athlete;
detect an information icon selection of the information icon; and
display athletic statistics, technique corrections, and a history of technique corrections for the selected athlete based on the information icon selection.

8. The non-transitory computer readable medium of claim 7 wherein the instructions configured to transmit the audio from the user device to the athlete audio equipment worn by the selected athlete includes instructions configured to transmit the audio to the athlete audio equipment configured as waterproof earbuds to wrap around an ear of the selected athlete.

9. The non-transitory computer readable medium of claim 7 further comprising instructions configured to communicatively couple the coach audio equipment and the athlete audio equipment to the user device with a low-power lightweight wireless protocol.

10. The non-transitory computer readable medium of claim 7 wherein the instructions configured to display the listed athlete includes instructions configured to display the listed athlete within a list having a scroll function and a search function.

11. The non-transitory computer readable medium of claim 7 further comprising instructions configured to replay the audio from the distributed computing system.

12. The non-transitory computer readable medium of claim 7 further comprising instructions configured to display operation icons including an add icon, the record icon, a play icon, the information icon, and a help icon, and wherein the operation icons are displayed in a column adjacent to the listed athlete.

13. An assistant coach system comprising:
a user device configured to display a listed athlete, an information icon, and a record icon, detect an athlete selection of the listed athlete as a selected athlete, and detect a record icon selection of the record icon; and
coach audio equipment configured to record audio, based on the record icon being selected, and wherein the user device is configured to transmit the audio from the user device to athlete audio equipment worn by the selected athlete, store the audio on a distributed computing system for later replay by the selected athlete, detect an information icon selection of the information icon, and display athletic statistics, technique corrections, and a history of technique corrections for the selected athlete based on the information icon selection.

14. The system of claim 13 wherein the athlete audio equipment is configured as waterproof earbuds to wrap around an ear of the selected athlete.

15. The system of claim 13 wherein the user device is configured to communicatively couple to the coach audio equipment and the athlete audio equipment with a low-power lightweight wireless protocol.

16. The system of claim 13 wherein the user device is configured to display the listed athlete within a list having a scroll function and a search function.

17. The system of claim 13 wherein the distributed computing system is configured to replay the audio.

18. The system of claim 13 wherein the user device is configured to display operation icons including an add icon, the record icon, a play icon, the information icon, and a help icon, and wherein the operation icons are displayed in a column adjacent to the listed athlete.

* * * * *